*INVENTOR.*
ORAL K. HUNSAKER
*BY*
Marechal, Biebel, French & Bugg
ATTORNEYS

INVENTOR.
ORAL K. HUNSAKER
BY
Marechal, Biebel, French & Bugg
ATTORNEYS

MAGNETIC INSPECTION OF IRON CASTINGS

Filed Sept. 14, 1961 6 Sheets-Sheet 3

INVENTOR.
ORAL K. HUNSAKER
BY
Marechal, Biebel, French & Bugg
ATTORNEYS

*INVENTOR.*
ORAL K. HUNSAKER
*BY*
Marechal, Biebel, French & Bugg
ATTORNEYS

*INVENTOR.*
ORAL K. HUNSAKER
*BY*
Marechal, Biebel, French & Bugg
ATTORNEYS

*INVENTOR.*
ORAL K. HUNSAKER
*BY* Marechal, Biebel, French & Bugg
ATTORNEYS

United States Patent Office 3,265,964
Patented August 9, 1966

3,265,964
MAGNETIC INSPECTION OF IRON CASTINGS

Oral K. Hunsaker, Dayton, Ohio, assignor to The Dayton Malleable Iron Company, Dayton, Ohio, a corporation of Ohio Filed Sept. 14, 1961, Ser. No. 138,025
4 Claims. (Cl. 324—37)

This invention relates to the non-destructive testing or inspection of iron castings by magnetic means or measurements to determine the final metallurgical compositions or soundness thereof and, more particularly, to the production inspection for acceptance or rejection of finished ferrous metal castings according to the metallurgical or crystallographic composition thereof as indicated by measuring certain magnetic properties or changes in properties of the finished castings.

As will be understood, in the production of various types of iron castings in foundry operation, a number of different chemical or metallurgical or crystallographic compositions or components may be formed or changed in the cooling and solidifying metal poured into a mold to form the casting and/or even after the casting has been formed and during heat treatment or annealing thereof. Many of such changes or formations of components occur under such differing causes and to such differing extents that they cannot be effectively and continuously predicted with desired accuracy, even with regard to a number of castings all poured from exactly the same molten metal composition except, in many cases, as such predictions are too general accurately to reflect minor variations in composition which may exercise a major effect upon the acceptability of a particular casting although occurring wholly during the cooling or solidification or treatment of a particular casting and completely beyond the control of the foundryman or metallurgist at that time.

Whereas the physical property variation in the casting caused by some of such composition changes may be readily susceptible to standard non-destructive testing techniques, other such uncontrollable metallurgical changes may unpredictably occur, even to rather minor degrees, variously from one casting to another even in the same production run, and yet not be susceptible to ready or rapid inspection or discerning by a non-destructive technique sufficiently simple or fast for use as an effective routine production-line inspection for accepting or rejecting a large number of supposedly identical castings as produced in a mass production foundry operation.

Merely as illustrative of such conditions, for example, it may be impossible to predict, with the manufacture of some iron castings, just how much of the carbon therein will precipitate into one form or another in each finished casting, and such amounts may vary widely among a great many castings, even though all the castings are poured from the same heat of molten metal and/or even from the same ladle thereof. Yet the proportion of carbon which actually ends up in one form or another may have a controlling effect on the acceptability of the casting for a particular purpose and/or on the mechanical strength properties thereof which cannot be readily determined without actually breaking the casting and/or without metallographic or X-ray or other testing techniques which are either destructive of the casting entirely or impractically expensive or time consuming or complicated for production line use.

Also, in the manufacture of malleable iron castings, the relative proportions of pearlite and ferrite actually resulting in the finished casting may vary widely from casting to casting. Whereas the presence of about 15–20% pearlite in a supposedly ferritic casting may effect the hardness thereof sufficiently for discernment by standard hardness testing procedures, the possible presence of a much smaller proportion of pearlite of about 5% is not readily detected by hardness testing, and may unpredictably occur even all efforts are made to produce ferritic castings having substantially no pearlite. Yet the presence of even so little as 5% pearlite in a supposedly ferritic casting, while not appreciably affecting the mechanical strength properties thereof, may so affect, for example, the magnetic properties of the casting as to make it unacceptable for certain uses such as magnetic clutch or electrical alternator parts requiring extremely high magnetic flux permeability and/or low retentivity.

As will be understood, particularly considering the high production of a mass production foundry in producing hundreds of identical castings for shipment and assembly elsewhere into various devices, it becomes particularly important to identify unacceptable castings at the foundry and prior to the time when the unacceptability thereof is discovered only after the casting has been shipped and assembled into the finished device and the finished device tested. For example, it may be that the only corrective measure for handling a casting with the wrong form of carbon or a magnetic clutch or alternator part with too much pearlite is to reject the casting and re-melt it in the next batch of molten metal, but it becomes particularly important as an economic or commercial consideration to be able to identify and reject all such castings at the foundry and before several hundred castings may be shipped to a purchaser and assembled into a finished device.

According to this invention, however, there is provided for the non-destructive testing or inspection of ferrous castings on a production line basis for determining the acceptability thereof as meeting certain specifications or characteristics influenced by the internal metallurgical or crystallographic or chemical composition of the castings, and by predicating such inspection or division of the castings into accepted and rejected groups upon measurements or comparative measurements of the effect which the particular composition or characteristic being considered has on certain properties of the casting such as magnetic permeability, magnetic retention, etc. Such inspection of magnetic properties is provided in accordance herewith with sufficient ease, simplicity, and rapidity to permit ready inspection of each casting of even a large production run for even greater accuracy than a spot checking inspection technique, and is provided for comparison with a predetermined or preselected standard of acceptability, so as to be substantially independent of the size or shape of the particular casting being inspected and without the need for breaking or even marring the castings being inspected or tested, and regardless of whether the casting is actually intended for a use where the magnetic properties thereof are important. As a further feature of this invention, there is also provided production line apparatus for automatically inspecting and either accepting or rejecting castings by discerning or evaluating the effect on magnetic properties of the casting caused by the particular composition or component of the casting under consideration, and substantially independently of whether such component or composition was formed or changed or altered during the cooling and solidification of the casting originally or during an annealing or other subsequent treatment thereof.

With the foregoing and other objects in view, this invention will now be more particularly described, and other objects and advantages thereof will be apparent from the following description, the accompanying drawings, and the appended claims.

Figure 1:
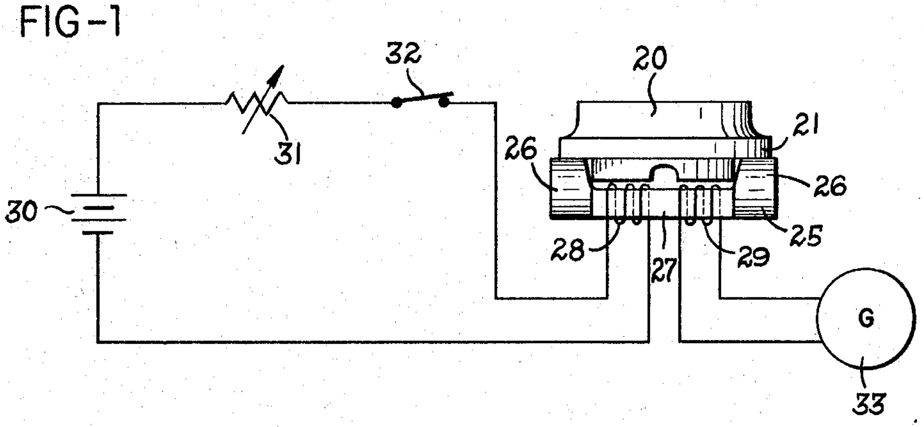
FIG. 1 is a somewhat diagrammatic illustration of apparatus embodying and for practicing this invention for inspecting of ferrous castings with regard to the magnetic permeability thereof.

As will be apparent, of course, the satisfactory utilization of a non-destructive testing or inspection teachnique in accordance herewith and involving variations in certain magnetic properties of ferrous castings necessarily presupposes that the particular characteristics or composition or property sought to be detected or determined shall have or cause some corresponding relation or variation in the magnetic properties being measured, but the applicability of this invention is not to be understood as being limited to situations where it is some magnetic property of the casting on which the utility thereof may depend. For example, in the manufacture of castings for primary utilization in a magnetic device (e.g., parts for a magnetically operated clutch mechanism), the ultimate utility of the casting for its intended use may depend largely upon the magnetic "softness" or permeability for ready magnetization and minimal hysteresis or flux retention characteristics for virtually instantaneous and complete demagnetization as desired.

The acceptibility of such castings, of course, is readily and directly determined in accordance with this invention simply by measuring whether or not each casting actually possesses the minimal magnetic induction and maximum magnetic retention characteristics permissible for acceptable castings to function satisfactorily for such purely magnetic uses. Indeed, such inspection may be more readily determined on the mass production basis in accordance herewith than by prior magnetic measuring techniques either requiring a specially made and shaped sample (which may not be representative of the production castings in all respects) or applicable only to certain limited specific shapes of castings such as wires or rods and the like.

Nevertheless, variations in the magnetic properties among ferrous castings are generally caused by variations in the composition or grain structure or mechanical structure within the solidified casting itself and determined or influenced in many instances, by such considerations as which of how much of several alternative compositions or grain structures may have been formed during the cooling and solidification of the casting in the mold and in a manner which is not completely subject to either metallurgical control or complete predictability. For example, the properties of a particular casting for magnetic uses may readily or routinely be varied from an acceptable level to an unsatisfactory one merely by the inadvertent formation in the casting of as little as 5% or less pearlite when a substantially ferritic structure was necessary or desired.

As well understood in the ferrous foundry art, there is no commercially practicable manner in which the inadvertent occurrence of such small amounts of pearlite can be absolutely predetermined or guaranteed against in each one of several hundred castings or a production run, and regardless of how close a control is maintained on the operating conditions and the iron, carbon, silicon, and other individual components in the molten metal. Thus, even a minor shrinkage flaw in the interior of the castings and having no significant influence on the mechanical strength characteristics required and/or some freakish or unpredictable variation in carbon precipitation during cooling of the metal may typically induce or be surrounded by enough pearlite, even in an otherwise acceptably all-ferritic casting, to reduce magnetic properties to a discernible degree to an unacceptable level, even though the pearlite amount is much too small to have a detectable effect on such characterisics as Brinell hardness normally determined by non-destructive testing and/or other characteristics which can be rapidly and routinely measured without breaking the casting or utilization of such uneconomically complex techniques as X-ray analysis of each casting.

Furthermore, particularly in uses having extreme mechanical property specifications, although relating in no way to magnetic uses of the finished casting, such internal flaws or the precipitation of too much graphitic carbon as flake graphite when some other matrix is desired, etc., may actually defy non-destructive testing by any known or economically acceptable production line method. Yet such inevitable and unpredictable occurrences of variations in internal form or crystal structure of the solidifying components of molten cast iron cannot be absolutely avoided by production control in an economically practicable mass production foundry operation.

Accordingly, this invention is primarily adapted and devised for the routine non-destructive inspection of each casting produced (instead of spot checking) with regard to detecting the possible unpredictable occurrences of variations in formation or composition or crystal structures which might otherwise affect the acceptability or satisfactory use or expected useful life of the casting. As will also be apparent from the foregoing, although the inspection method in accordance herewith utilizes certain magnetic properties as an indirect indication of the presence or absence of other unacceptable conditions within the casting (which conditions may be different for each type of casting inspected), a precise or absolute measuring determination of magnetic values is not necessary, but merely the repeated and rapid comparison of the individual production castings with acceptability specifications which may have been thoroughly and carefully determined separately and preliminary by known methods (no matter how expensive or complicated) regarding a standard sample casting defining a level of acceptability for the particular production run or type of castings being inspected.

Purely as illustrating but not limiting this invention or the applicability thereof, it may be convenient to describe this invention in more detail with regard to the magnetic inspection and acceptance or rejection of castings according to the amount of undesired pearlite occurring in the finished form thereof. For simplicity of explanation, such description will relate to castings specifically manufactured for use as the magnetized parts of a magnetic clutch—i.e., an end use for which the acceptability of the castings can be readily and conclusively determined by actually assembling the clutch device and noting whether or not the cast parts thereof do possess the desired properties for satisfactory operation.

Figure 13:
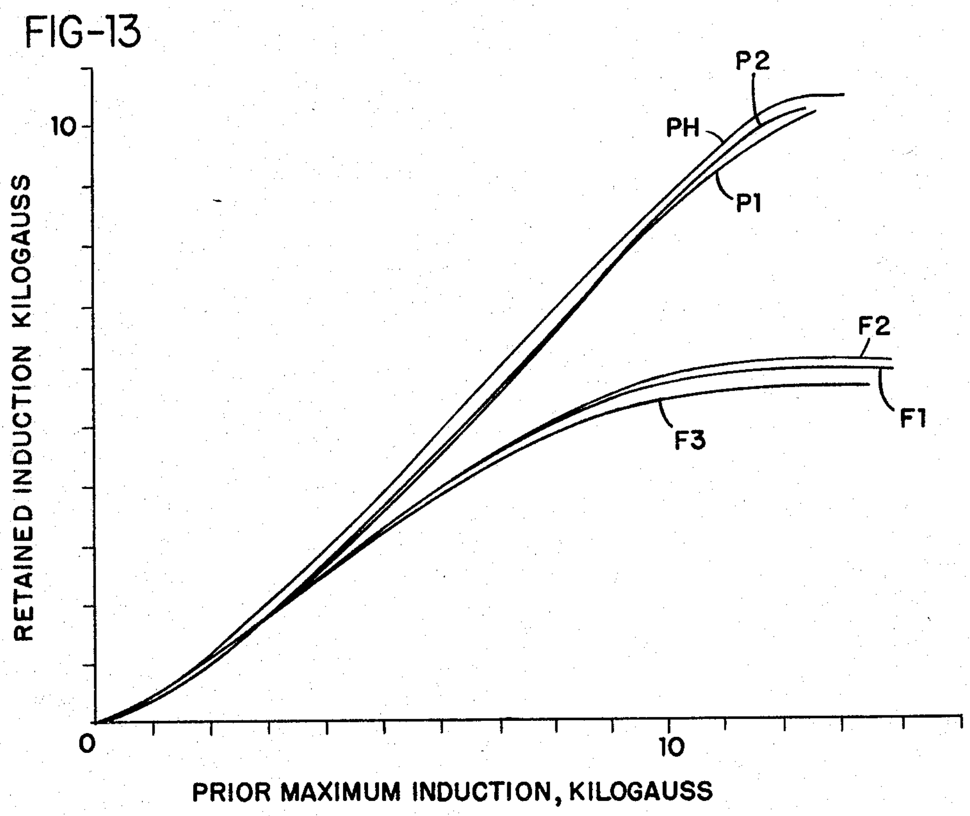
FIG. 13 is a graphic representation of retained magnetic field or induction data for several different castings having different proportions of pearlite and ferrite.
Figure 14:
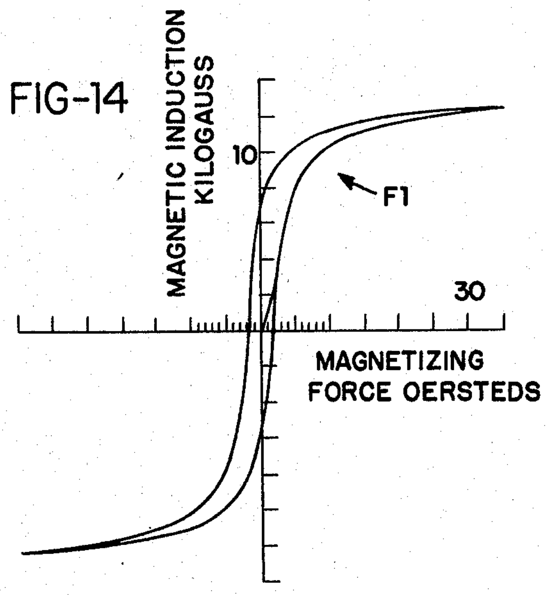
FIGS. 14–17 are graphic representations of the hysteresis loops corresponding to some of the castings as to which data are indicated on FIGS. 2 and 13.
Figures 15, 16, 17:
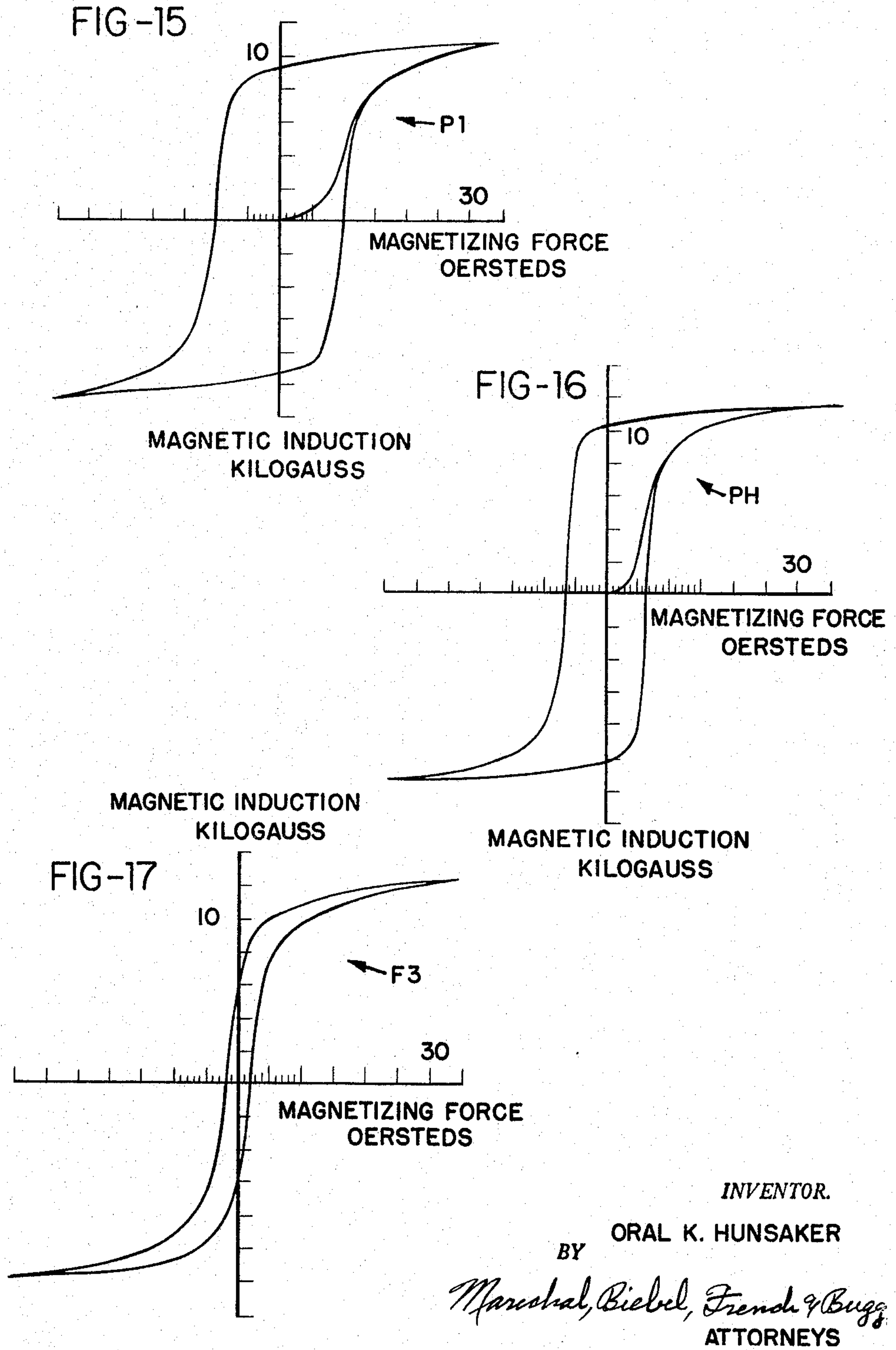

Thus, the D.C. magnetization curves and hysteresis loops were determined by conventional methods (e.g., those set forth in Stout, Basic Electrical Measurements, Prentice-Hall, Inc., New York (1950), sections 16.8 and 16.9 and using the apparatus diagrammed at p. 376) for a variety of identically shaped toroidal magnetic clutch castings (as indicated generally at 20 in FIG. 1) of known differing ferrite-pearlite ratios and demonstrably different magnetic acceptability when assembled into a magnetic clutch device. Such data, with respect to the magnetic induction achieved under varying quantities of impressed magnetizing force, are diagrammatically or graphically represented in FIG. 2, while the data for retained magnetism for various initially impressed quantities of magnetic induction are indicated in FIG. 13, and the corresponding hysteresis loops for the various different castings are shown in FIGS. 14–17. The curves in these diagrams indicate the noted data, respectively, with regard to castings F–1, F–2 and F–3 (omitted from FIG. 2), possessing acceptable properties and a satisfactorily complete ferritic structure, while castings P–1 and P–2 contained an unacceptably high proportion of pearlite. An additional sample P–H is also indicated and initially contained too much pearlite, but was subsequently subjected to a six-hour heat treatment in a manner generally believed to change pearlite originally formed during solidification of the casting into a more ferritic structure.

As will be apparent from comparison of the various diagrammed data, the presence of even minor portions of pearlite has a significant effect on the magnetic permeability (as measured by magnetic induction in FIG. 2) and on the magnetic retention (as indicated in FIG. 13 and the hysteresis loops of FIGS. 14–17. Actually, it was found that variations in magnetic properties to an extent discernible with this invention were produced by quantities of pearlite (e.g., only 5% or less) which were too small to produce significant variations in the standard Brinell hardness tests (usually utilized in an attempt to detect excessive pearlite in a non-destructive manner), and quite apart from the added advantage of this invention that inspection in accordance therewith is more rapidly and economically achieved in mass production work than even spot checking by the standard Brinell method of hardness testing, or other conventional non-destructive testing means such as use of test lugs, etc.

Once it is determined, by any of a variety of known methods and techniques, that variation of a particular condition or composition characteristic of the casting produces a discernible difference or variation in magnetic properties, inspection and acceptance or rejection of the castings depending upon the occurrence or absence of such condition or characteristic is readily achieved in accordance herewith. It is further to be noted that there need not be a direct or proportional or continuous relationship quantitatively between the condition for which inspection is desired and the variation of magnetic properties caused thereby. That is, satisfactory inspecting results in accordance herewith do not necessarily require that, for example, the decrease in magnetic induction or the increase in magnetic retention be directly or otherwise continuously proportional to the quantity of pearlite in the casting; it is sufficient in accordance herewith merely that at some point on the curves relating magnetic properties to pearlite content here be a significant or discernible difference in the magnetic properties being measured as between a casting having too much pearlite and one which is acceptably ferritic.

Having determined that an unacceptably large amount of pearlite (or whatever other condition it is desired to detect by the inspection, such as, for example, internal flaws surrounded by pearlite or an unacceptably large amount of a certain form of graphite, etc.) does produce a discernible variation in magnetic properties at some point in the curves or under certain conditions of imposed magnetizing force or magnetic induction, subsequent and rapid inspection of large numbers of production castings is then achieved in accordance herewith by impressing such magnetic conditions on the casting and noting whether or not the magnetic properties thereof exceed or fall below the predetermined standardized level.

Referring to the drawings, in while like reference characters refer to like parts throughout the several views thereof, apparatus for inspecting castings herewith are diagrammatically indicated in FIG. 1 as particularly adapted to accepting or rejecting castings depending upon whether the magnetic induction achieved therein by a predetermined impressed magnetic force exceeds or falls below a particular value predetermined as indicating, for example, the presence in the casting of more pearlite than desired. It is to be understood, of course, that it is not controlling here whether or not the measured magnetic induction characteristic of the casting is desired as one of the useful properties thereof or whether it is sought to detect excess pearlite merely as an indirect indication that an internal flaw may exist around which may form excess pearlite or other material atypical or high magnetic resisting. For that matter, it is not important here whether it is a predominantly ferritic or a predominantly pearlitic casting which is desired to meet the purchaser's specifications and/or whether it is too much pearlite or too little which is desired to be detected by the inspection.

Thus, referring to FIG. 1, a casting to be inspected is shown at 20 as having a generally toroidal shape including a central flange 20. The bottom surface of flange 21 is readily machined or ground to a smooth condition and, preferably, with such grinding or machining operating being required for other reasons in the production of the casting. The apparatus includes an electromagnetic inspecting head 25 composed preferably of a highly permeable and magnetically "soft" relatively pure and carbon-free iron, and machined to a shape generally as indicated in the drawing and particularly to accommodate and interfit with the size and shape of casting 20 as shown with the machined bottom surfaces of flange 21 resting upon upstanding end portions 26 of head 25. It will be understood that such requirement is not considered to be a significant limitation on the utility or adaptability of this invention to mass production foundry practices where a particular production line may spend days or weeks turning out hundreds or thousands of identical castings.

Around the elongated central core portion 27 of head 25 are wound two coils of wire—i.e., a magnetizing coil indicated at 28 and a measuring coil indicated at 29, with both coils correlated with the shape of head 25 so that the coils are not in direct contact with any of the surfaces of casting 20. In a situation such as indicated in the drawing where the length of head 25 was approximately 6½" and the height of upstanding end portions 26 was about 1½", with the portions extending about ⅝" above central core portion 27, satisfactory results were achieved with magnetizing coil 28 comprising about 53 turns of #15 wire and with measuring coil 29 comprising about 20 turns of #22 wire, although, as will be understood, the specific design of coils 28 and 29 is indicated according to conventional knowledge depending upon and to accommodate such considerations as the quantity of magnetizing force desired to be imposed upon the casting being inspected, the sensitivity or extent of deflection desired by whatever indicator is used to detect the results of the measuring coil 29, with larger deflections being obtained by increasing the number of turns of wire in coil 29, etc.

Magnetizing coil 28 is connected, in known and well understood manner, to a circuit such as diagrammed in FIG. 1 and including a battery 30 or other source of direct current power, suitable resistances or variable resistances as indicated at 31, and a switch mechanism 32. Measuring coil 29 was connected, in known and well understood manner, to an indicating device shown as galvanometer 33, which may be any suitable variety of detecting or indicating apparatus such as a fluxmeter reading in maxwells, a gaussmeter, a voltmeter, etc., and/or any similarly operating detector indicating merely "accepted" or "rejected" because, as noted, the actual or absolute magnetic induction value being measured is not itself of ultimate significance in accordance herewith.

With such an arrangement as indicated in FIG. 1 for measuring the magnetic induction in casting 20 resulting from the impressing thereon of magnetic force generated by magnetizing coil 28 and head 25, the resulting inspecting flux produced by the electromagnet is divided into two equal paths along the circumference of toroidal casting 20, each path comprising one half of the circumference. With the surface of flange 21 ground smooth and resting squarely on upstanding end portions 26 of electromagnetic head 25, possible variations in the flux induced into casting 20 from head 25 and caused by air gaps are minimized, while it is also preferred that the cross-sectional area of head 25 be somewhat larger than the total cross-sectional area of the flux path induced in casting 20 for achieving optimum sensitivity and reproducibility of results.

A point is selected on curves (such as those in FIG. 2) at which the difference in induced magnetic flux as between acceptable and unacceptable specimens is sufficiently great to be easily detected. The apparatus is then adjusted so that magnetizing coil 28 will produce the required quantity of magnetizing force, and the indicating device 33 is adjusted to indicate those castings in which the desired minimum level of flux is induced. Obviously, this adjustment is most readily accomplished by pre-selecting or adjusting the apparatus, in known and well understood manner, to read as desired when a standardized acceptable casting is being tested and/or to distinguish between pre-selected acceptable and unacceptable casting specimens or samples. Thereafter, castings to be inspected are merely placed upon head 25 with switch 32 open, the switch is closed, and a direct "accepted" or "rejected" reading taken from galvanometer 33, after which, switch 32 is opened and the inspected casting removed and replaced with another casting in, actually, less time than is required to describe the operation.

As will be apparent from the foregoing, the magnetic permeability of casting 20 is being measured directly and indicated electrically by the deflections of galvanometer 33. Although other means of indicating the induced magnetic flux in casting 20 give satisfactory results (e.g., mechanical instead of electrical measurement thereof as by measuring the force necessary to separate casting 20 from magnetized head 25), the simplicity of the electrical type of measurement is preferred. The utilization of a permanent magnet instead of electromagnet head 25 is not preferred in accordance herewith, however, because certain side effects, perhaps resulting from the intentionally low permeability of permanent magnets, may introduce non-uniformities into the measurement of sufficient size to overshadow the differences in the permeability of the casting specimens which it is desired to detect. Also, under some conditions and with certain specific specimens, it may be desired to include in a technique in accordance herewith actually clamping casting 20 forcibly against magnetic head 25 further to minimize the effects which possible air gaps between the contacting surfaces of the specimen and the electromagnet might have on the quantity of flux induced in the specimen.

Figure 2:
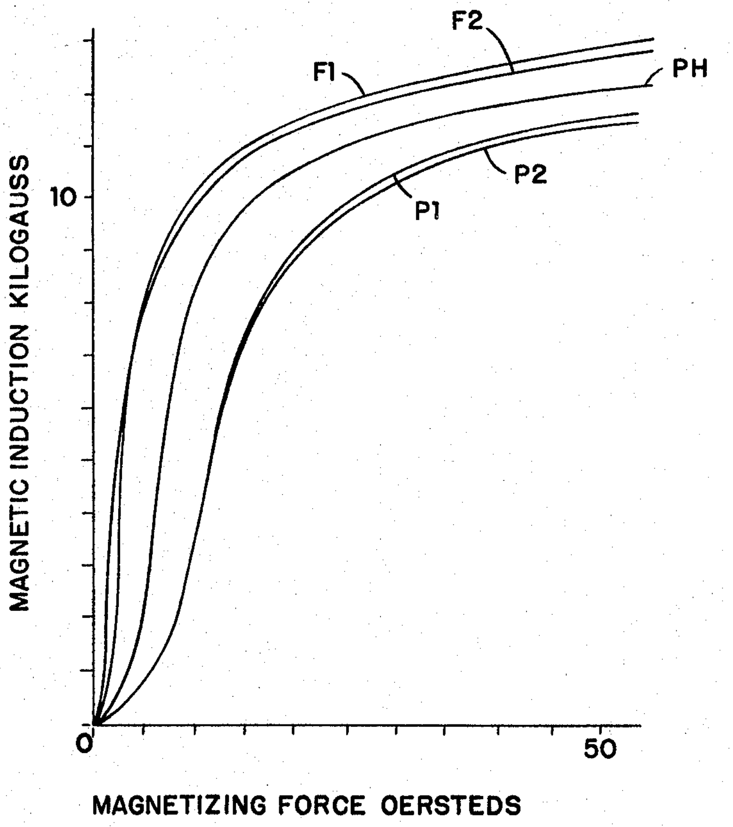
FIG. 2 is a graphic representation of magnetization data for a number of castings having varying amounts of pearlite and ferrite therein.

As noted by comparing the data of FIGS. 2 and 13, composition variations between acceptable and unacceptable castings to be inspected may also induce therein variations in the amount of magnetic flux retained by the specimen after being subject to a magnetizing field force. In many applications of methods in accordance herewith, the inspection of castings according to such magnetic retention may be more convenient or accurate or preferred than the above noted inspection from the standpoint of magnetic permeability or reluctance to induced flux. For example, since magnetic retention is not a momentary condition, the measurement thereof may simplify the inspection procedure here regarding, particularly, mass production techniques at least insofar as the flux may be induced in the castings at one point of space or time and the measurement or the amount thereof which is retained by the castings may be subsequently made at another point and after the casting has been removed from the flux-inducing field.

Similarly, if the flux-inducing mechanism is designed and/or operated so as to saturate particularly that portion of the casting through which the flux path passes, the indicated retention measurements may be considered as substantially independent of variations arising from non-uniform contact between casting and electromagnet, even with a rough surfaced casting, so that the necessity or desirability for special finishing or grinding treatments of the casting prior to inspection may be eliminated. Indeed, inspections of a casting both as before and after normal finishing treatment thereof (for example, treatment in straightening dies as routinely utilized in malleable iron foundries) may be accomplished to detect otherwise undetectable internal strains or stresses inadvertently imparted to the casting during the finishing treatment and which may have an effect on both the magnetic retention properties and the ultimately expected life of the casting in use.

As illustrative of a system in accordance herewith for inspecting production castings as to the amount of a previously imposed magnetic force retained by the casting, may be noted the apparatus as indicated in FIGS. 3–12, which is also a preferred embodiment of semi-automatic inspecting apparatus for use in large mass production operations.

Figure 3:
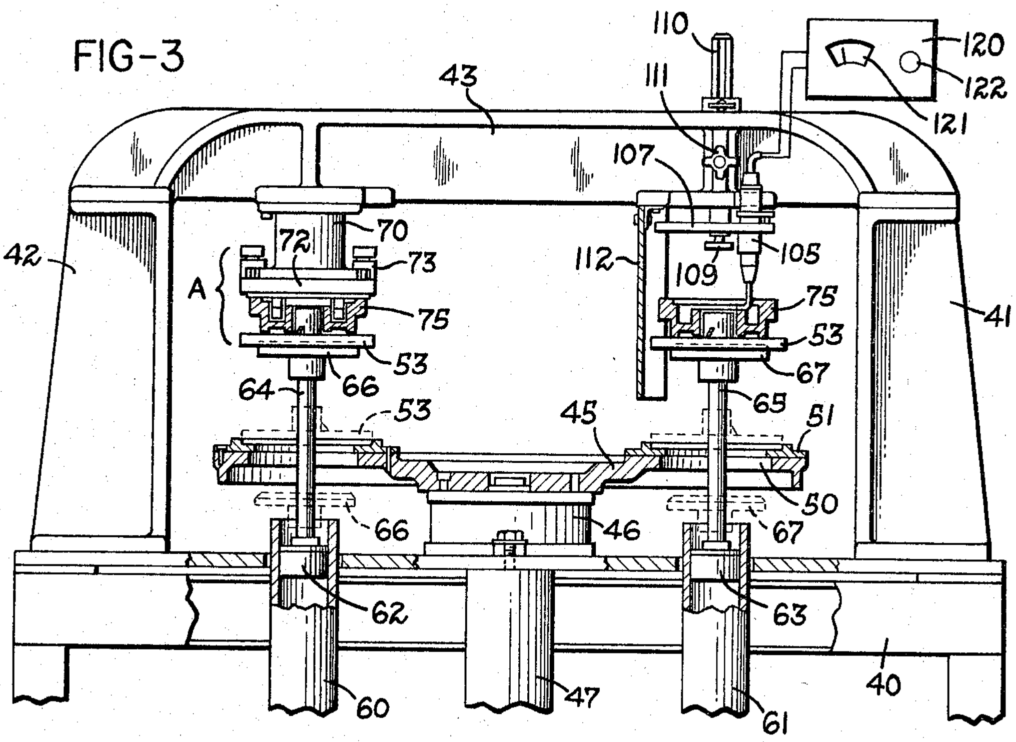
FIG. 3 is a view partially in elevation and partially broken away of inspecting apparatus embodying and for practicing this invention for accepting or rejecting castings in accordance with determination of magnetic retention or remanence properties.
Figure 4:
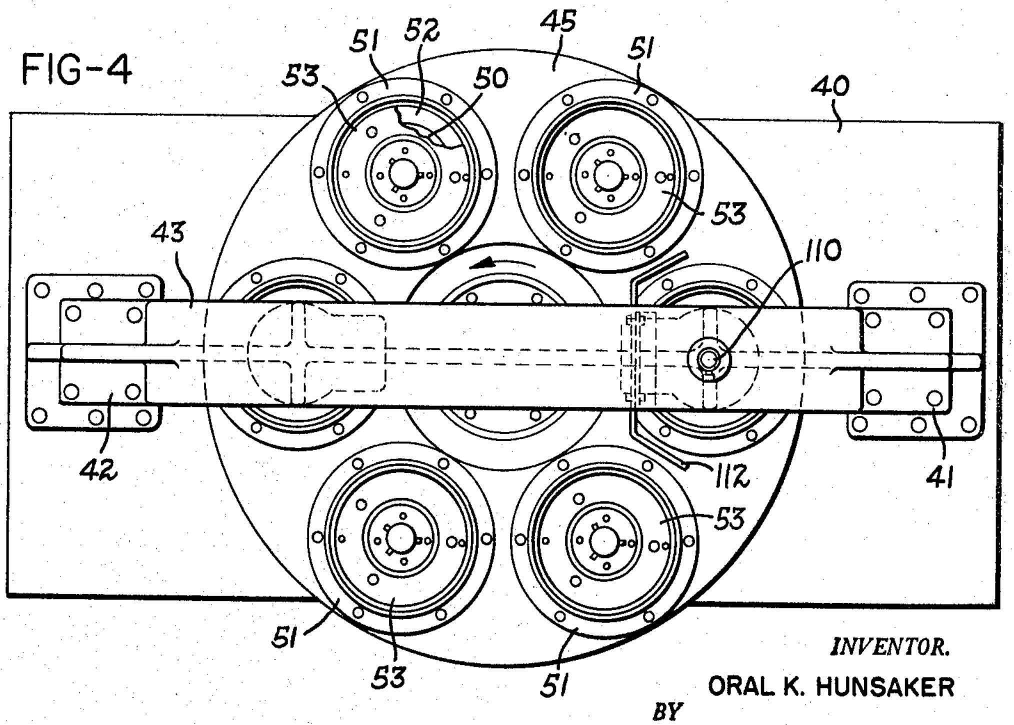
FIG. 4 is a top plan view of the apparatus of FIG. 3.

Thus, there is shown, particularly in FIGS. 3 and 4, such apparatus as having a main table or frame 40 on which are two upstanding posts 41 and 42 for supporting a horizontal top frame member 43. Supported centrally on table or frame 40 is a rotating table 45, mounted as at 46 on a bearing member so as to be spaced somewhat above the top of frame 40, and including a pneumatic motor and the controls therefor indicated at 47 whereby table 45 is rotated automatically, intermittently, and stepwise, with a stop of predetermined duration between each successive step-wise rotating movement. The construction and control of such a rotating table is not shown in detail as being well known and widely used for the automatic conveying or inspecting of various objects, and is commercially available as, for example, with the Bellows pneumatic rotating table manufactured by Bellows Corporation, Akron, Ohio.

Equally spaced around table 45 are shown six round holes 50, each provided with a surrounding flanged ring 51 having an open and indented annular seat 52 for receiving and positioning a circular support plate 53, fitting into rings 51 loosely enough to be freely lifted therefrom. At two diametrically opposed positions beneath table 45 and generally beneath cross member 43 are pneumatic piston-and-cylinder arrangements 60 and 61, having pistons 62 and 63 for raising and lowering piston rods 64 and 65 at the upper ends of which are positioned circular lifting plates 66 and 67. These plates 66 and 67 are of a sufficiently small diameter to pass freely through holes 50 in table 45, upon the action of pneumatic devices 60 and 61, and to be raised and lowered from the upper position shown in full line in FIG. 3 to the lower position indicated in dotted lines in the drawing. As plates 66 and 67 are raised from the dotted line position of FIG. 3 to the raised position, they engage the bottoms of and lift plates 53 from the dotted position thereof resting on table 45 to the raised position indicated in full line in the drawing. Preferably the top edges of plates 66 and 67 are somewhat beveled for interfitting relation with a recess 68 in the bottom of plates 53 (see FIG. 7) for the correct positioning and support of plates 53 as they are lifted from within rings 51 on table 45 to the raised position indicated in FIG. 3.

As will be understood from the foregoing, a plurality of castings to be inspected may be placed upon the six plates 53 on table 45, as described in more detail below. Thereafter table 45 is rotated intermittently through 60° in order to bring each of the plates 53 successively above each of the pneumatic lifting devices 60 and 61 (which are then in lowered position), the lifting devices are actuated, in known manner, to raise and lift both diametrically opposed plates 53 into the raised position of FIG. 3 and to hold them there for a predetermined time of any desired duration, during which, in this case, magnetization and measurement occurs, after which the lifting devices 60 and 61 lower their loads so that the two plates 53 are again resting within their respective rings 51 on table 45 and the two lifting plates 66 and 67 are withdrawn below table 45, which then rotates through another 60° to bring two more plates 53 above lifting devices 60 and 61 for a repetition of the lifting and lowering cycle just described.

Figure 7:
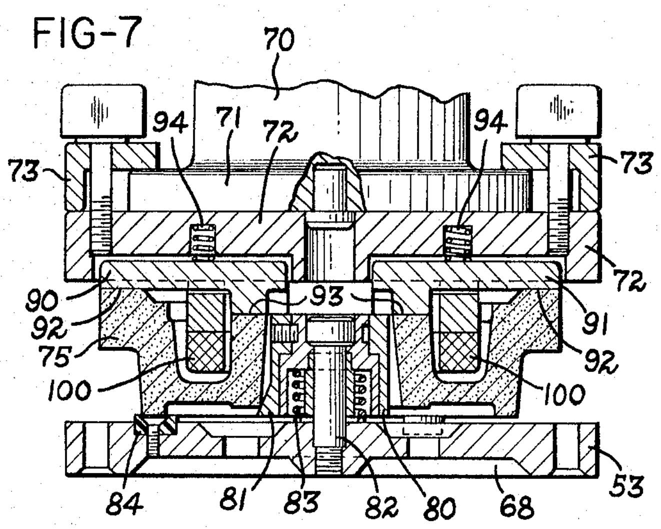
FIG. 7 is a view partially in vertical section and on a somewhat larger scale of that portion of the apparatus of FIG. 3 indicated by the brackets A thereon and taken on the lines 7—7 of FIGS. 5 and 6.
Figures 5, 6, 9:
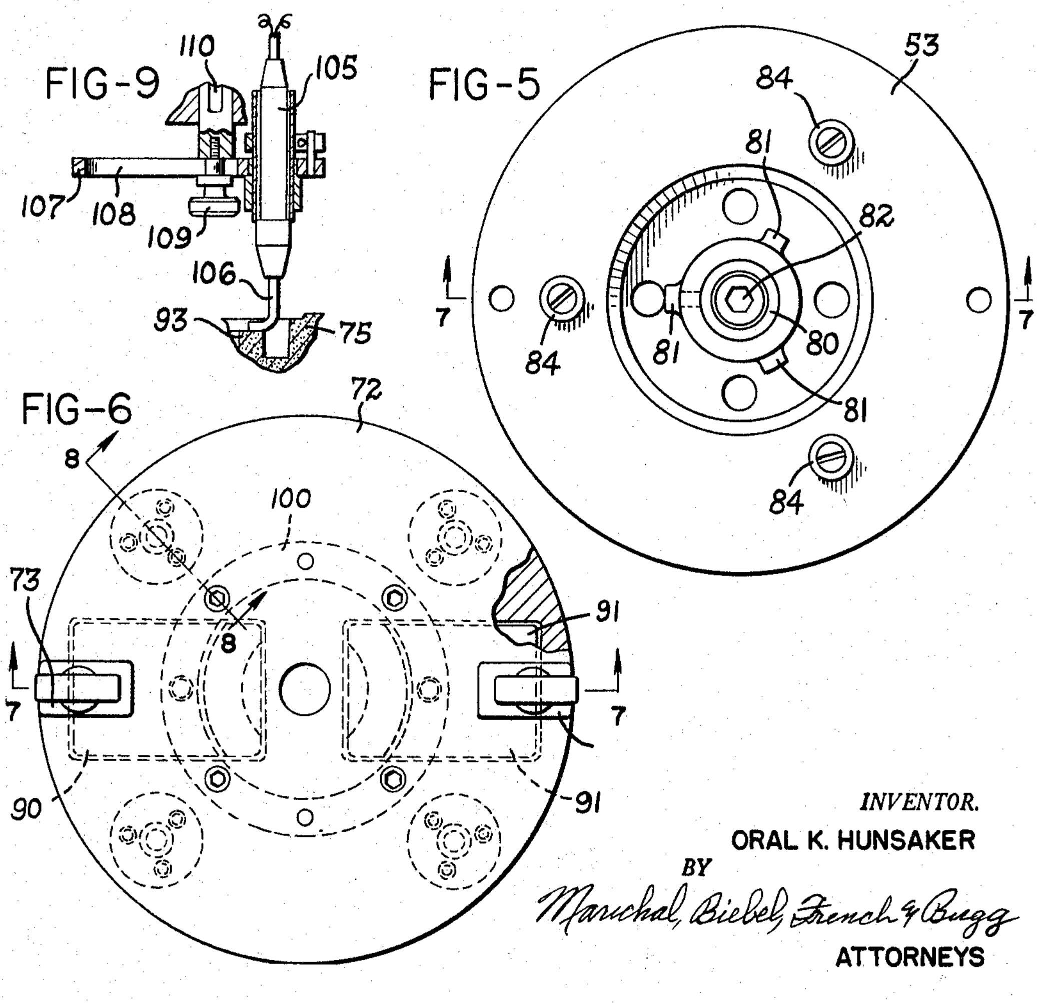
FIG. 5 is a top plan view of the portion of the apparatus of FIG. 3 on which a casting is supported during inspection thereof.
FIG. 6 is a top plan view of the portion of the apparatus of FIG. 3 which cooperates with a casting resting on the structure of FIG. 5 during an inspection.
FIG. 9 is an enlarged fragmentary view of a portion of the measuring and sensing apparatus of FIG. 3.

Magnetization of a casting to be inspected occurs each time a plate 53 is lifted from table 45 by lifting device 60 to the upper position shown in FIG. 3, and the structure there involved is indicated on a somewhat larger scale in FIGS. 5–7, the latter of which illustrates the structure indicated by the brackets A in FIG. 3. Thus, a cylindrical post 70 depends from upper frame member 43 and having at the bottom thereof a flange 71. A circular plate 72, preferably of non-magnetic material, is clamped to flange 71 of post 70 as by screw clamps indicated at 73. The casting to be tested is indicated at 75 and as having the particular double toroidal shape shown, for illustrative purposes.

Thus, casting 75 is carried by plate 53 during the raising and lowering thereof by lifting devices 60 and 61. For this particular casting 75, plate 53 is provided with means for accurately positioning casting 75 on plate 53 and comprising a core piece 80 having three tapering spacers 81 therearound for centering and supporting casting 75. As indicated in FIG. 7, core piece 80 is slideably engaged on a center pin 82 and urged upwardly therealong by a spring 83 so that casting 75 is resiliently urged upwardly off plate 53, pads 84 are positioned on plate 53 to maintain casting 75 level. Plate 53 and the appertaining structures touching castings 75 and/or in close proximity thereto are all made of non-magnetic material (e.g., aluminum) so as not to permit induced flux draining from casting 75 and to avoid possible stray magnetic fields near or around the casting to be measured.

As will be understood from the foregoing, when a casting 75, positioned on a supporting plate 53, is raised from table 45 into the position of FIG. 7 by the action of lifting mechanism 60, it is for the purpose of impressing upon the casting a magnetic force the retention of which is to be measured after that particular casting moves, with rotation of table 45, from lifting device 60 around to lifting device 61. The magnetizing coil element for impressing the desired magnetic force and the magnetizing contacts thereof actually contacting casting 75 may need to be a different shape and size for each different casting tested. For example, it is desired to saturate the part of the casting forming the flux path in order to be assured of a flux retention measurement of the desired accuracy and reproducibility. Since the size of the cross section of the casting being magnetized has a controlling effect on the saturating amount of flux, it is preferred to select for each casting a particular flux path therethrough having at the poles the smallest cross section to saturate commensurate with an accurate measurement, and to arrange the magnetizing contacts so that the casting is fully magnetized in these particular areas where retention is later to be measured.

Figure 8:
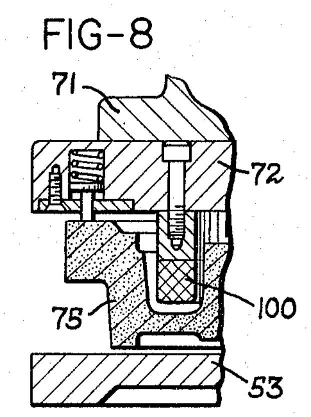
FIG. 8 is a fragmentary sectional view along the line 8—8 of FIG. 6.

As illustrative of the foregoing considerations, and as applied in the illustrated apparatus to a casting of the shape of 75, it will be noted that magnetizing casting 75 in the raised position of lifting device 60 (i.e., FIG. 7) is achieved by two diametrically opposed contact plates 90 and 91, each of which contacts casting 75 on the annular edges 92 and 93 thereof, and each of which is made of a highly permeable material such as extremely low-carbon steel. Contact plates 90 and 91 are movably affixed to plate 72 and may move resiliently with respect thereto through springs 94. Also affixed to plate 72 (as indicated at FIG. 8) is toroidal wound electromagnetic coil 100 of a size to fit into the annular depression noted in casting 75 between the edges 92 and 93 thereof.

Accordingly, when lifting device 60 lifts plate 53 with casting 75 thereon from table 45, the casting is raised until the upper edges 92 and 93 thereof contact plates 90 and 91, as a result of which the casting is saturated with magnetic force under the action of current flowing through electromagnetic coil 100 and with the flux paths in casting 75 being generally circumferential as indicated by the two diametrically opposed contact plates 90 and 91. The spring urging of core piece 80 and the downward spring urging of contact plates 90 and 91 assure firm contact with the casting surface and saturation of the casting in minimal time. After saturation, lifting device lowers plate 53 and the casting thereon back down on to table 45, which then rotates for lifting device 60 to raise the subsequent casting 75 on the next subsequent plate 53 into the position of FIG. 7 for magnetizing. As noted, since the casting is resting on and associated with only non-magnetic materials (except for contact plates 90 and 91), whatever magnetic force it inherently retains will not be drained off and will remain in the casting until subsequently measured or detected in accordance herewith.

Such measurement or detection of the amount of magnetic induction retained by casting 75 subsequent to the magnetization thereof as in FIG. 7 occurs as the particular casting 75 moves around on table 45 to the position above lifting device 61, which lifts the magnetized casting 75 on plate 53 to the upper position shown in FIG. 3 and so that the detecting probe mechanism 105 contacts casting 75 as by contact finger 106 on probe 105 engaging surface 93 of casting 75. As noted, probe 105 is supported in a bracket 107 having a slot 108 therein for engaging a set screw 109 in the bottom of a depending rod 110 slideably supported in cross frame member 43 and adjustable vertically as by set screw 111. In this manner and by the mutual adjustments of set screws 109 and 111, contact finger 106 of detecting probe 105 is readily vertically and horizontally adjusted to contact the desired surface or portion of the surface of the casting 75 as it is raised by lifting device 61. Preferably, also, a shield 112 is positioned surrounding the measuring station.

As indicated, detecting probe 105 may be any conventional magnetic field detecting device such as the well-known Hall probe, and is connected, in known manner, to a conventional gaussmeter device as indicated at 120 and having a dial or other indicating means 121 and/or a visible or audible signal 122 for indicating either a numerical measurement of retained magnetic induction in casting 75 and/or merely the acceptability or rejection of each particular casting. Since the construction and operation of such a gaussmeter and the necessary detecting probe 105 therefor is both conventional and well understood, it need not be further discussed in detail.

As will be understood from the foregoing, a casting is placed on each of the several plates 53, and, as table 45 rotates each casting is successively moved over lifting device 60, lifted thereby to be magnetized by coil 100, lowered again to table 45, and moved through sequential steps thereof to lifting device 61, which raises the casting for a measurement of retained induction to be made and then returns the inspected casting to table 45, at which point, depending upon the measurement indicated, the casting is removed from table 45 and placed with either the accepted or rejected castings, and the empty place on the table receives another casting to be inspected as the table and the machine containue the sequential and step-wise operating cycles described.

As previously noted, the positioning and supporting core piece 80 on plate 53 as well as the size and configuration and positioning of coil 100 and contact plates 90 and 91 in FIG. 7 are required to be coordinated with the particular shape and size of the casting being inspected, although the described horizontal and vertical adjustments of probe 105 are adaptable to accommodate a wide variety of sizes and shapes of castings.

Figure 10:
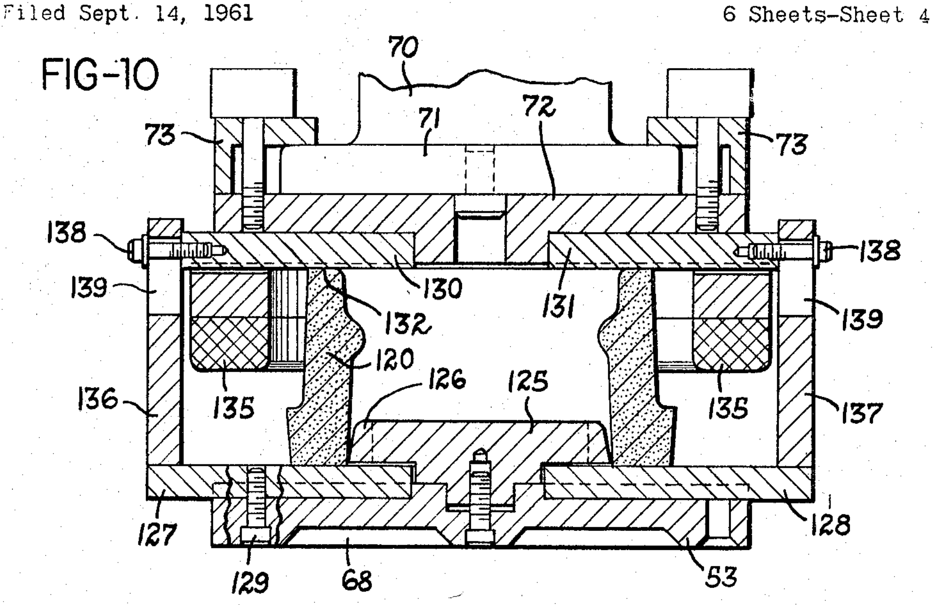
FIGS. 10 and 11 are views similar to FIG. 7 but illustrating fixtures and devices for accommodating the inspection of castings of different shapes than the casting illustrated in FIG. 7.
Figures 11, 12:
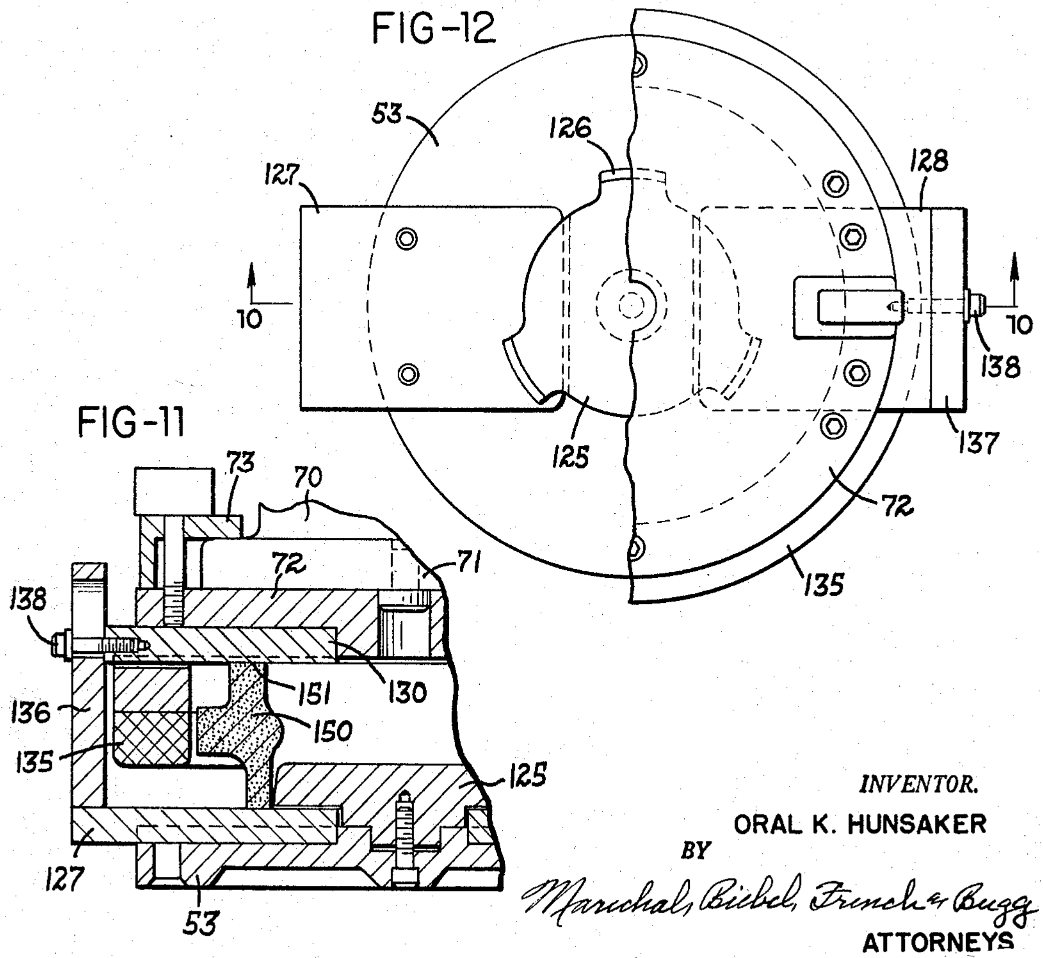
FIG. 12 is a view similar to FIG. 5 but illustrating the supporting fixtures and arrangements for accommodating castings such as shown in FIGS. 10 and 11.

As illustrative, there is shown in FIGS. 10–12 an arrangement for the magnetizing station to accommodate a casting 120 of a different size and shape than casting 75 previously discussed. Thus, a differently shaped centering and positioning core 125 is affixed to the plates 53 when castings such as 120 are being inspected. Core piece 125 is provided with three centering lugs or spacers 126 for centering the casting, all of which are preferably made of non-magnetic material. In this case, casting 120 rests upon very low-carbon steel plates 127 and 128, affixed to plate 53 as by bolts 129 and extending radially somewhat beyond plate 53, although not by an amount which cannot be accommodated by rotating table 45. In this case, also, as indicated in FIG. 10 (which is similar to FIG. 7), the magnetizing contact of casting 120 is by having flat very low-carbon steel opposed contact plates 130 and 131 directly contact the upper annular edge 132 of casting 120. Thus, contact plates 130 and 131 are affixed, as by bolts not shown, so plate 72 and carry depending therefrom toroidal electro-magnetic coil 135, which, in this case, is outside casting 120.

To complete the desired flux paths for saturating casting 120, depending side plates 136 and 137 are adjustably mounted on contact plates 130 and 131 as by set screws 138 in slots 139 in the side pieces so that they can adjust to contact plates 127 and 128 when supporting plate 53 is in the raised position and while upper edges 132 of casting 120 are engaging contact plates 130 and 131 for the desired saturation and magnetization of casting 120. As further indicated in FIG. 11, another casting 150, shaped somewhat like casting 120 but being lower in height is accommodated by substantially the same structure illustrated in FIG. 10, but with side pieces 136 and 137 raised as shown in FIG. 11 so that the bottom edges thereof will contact plates 127 at the same time as the top edge 151 of casting 150 engages contact plate 130 to form the desired flux paths or circuit for saturating the casting through a portion of small cross section as indicated.

As will be understood, the design of coils 100 and 135 and the power supplied thereto are arranged to provide the desired flux saturation of the designated portions of the particular castings being tested, and are considerations which are readily calculated or otherwise determined in well understand manner for any particular size or shape of castings. Purely as illustrative, however, it may be noted that satisfactory results have been obtained in accordance herewith in more than adequately saturating the various toroidal magnetic clutch castings illustrated by using about 20 volts D.C. current and with coils 100 and 135 providing about 1200–1600 ampere turns.

As is apparent from the foregoing, then, there is provided in accordance herewith a rapid and simple system for the non-destructive testing and evaluation and inspection of a large number of mass produced ferrous castings for readily detecting any of such castings which includes an unacceptable composition or structure or property characteristic for the particular purpose for which the castings are manufactured and intended; and such system is directly applicable to a foundry production line for separating the casting produced into acceptable and non-acceptable groups in the foundry and prior to shipment for assembly into the ultimate device or apparatus for which the castings were manufactured.

As noted, such non-destructive testing or inspection technique is directly applicable to inspecting or detecting or evaluating any sort of composition or structure characteristic of ferrous castings which produces or affects the magnetic properties of the castings or a detectable change therein, and completely regardless of whether or not the magnetic property so affected forms a particular useful characteristic of the casting. It will also be noted that non-destructive testing of magnetic properties in accordance herewith may readily and economically be applied to every casting in a large mass production group, rather than merely spot checking by other testing techniques, and, in many instances, provides a more rapid and/or conclusive inspection technique for physical properties of the casting, expected useful life thereof, and other characteristics, than do a number of conventional inspection techniques (e.g., Brinell hardness tests, etc.) commonly used for direct inspection of a useful property of a casting or indirect evaluation of some compositional characteristic which may incidentally affect hardness. In view of the aspects of this invention enabling concentration or localizing the magnetic flux path to certain predetermined areas of the casting (which areas may be selected either because they are believed representative of the whole casting or because they represent a peculiar section thereof in which critical differences are most likely to occur), the results hereof may be more readily or definitively achieved than even a so-called non-destructive test technique involving casting of special inspection lugs on excess parts of the casting to be broken off and examined microscopically or otherwise.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In non-destructive testing and inspection apparatus of the character described for testing and inspecting the acceptability of ferrous castings by testing the magnetic permeability of a portion only of each said casting, the combination which comprises an electromagnetic inspection head configured for interfitting relation with said castings for supporting said casting during testing and for contact therewith to induce therein a directed electromagnetic flux path, a magnetizing coil winding around at least a portion of said head for establishing therewith an electromagnetic field for inducing said directed flux path into said casting when in contact with said head, said coil winding being configured to conform to said portion of said casting to be tested, a magnetic measuring coil for detecting the quantity of magnetic induction induced into each said casting in contact with said head and within said magnetic field established by said magnetizing coil, and indicating means for indicating said quantity of magnetic induction detected by said coil and the acceptability or unacceptability of each of said mass produced castings.

2. In a non-destructive testing and inspection apparatus of the character described for rapid production line testing and inspecting the acceptability of a selected portion of each of a plurality of mass produced ferrous castings by testing the magnetic retention properties of a portion only of each said casting, the combination which comprises a magnetizing station in said apparatus and including an electromagnetic coil for establishing a directed magnetic field, means at said magnetizing station for supporting each said casting during testing and for contacting each said casting with said coil in said magnetic field for inducing therein directed magnetism in said selected portion the retention of which is to be measured, said coil and said contacting means being configured for interfitting relation with and to conform to said selected portion of said castings for producing a directed saturated flux path through said selected portion of said casting, a measuring station in said apparatus, means for detecting at said measuring station the amount of magnetization retained by said portions of said castings from the magnetization thereof at said magnetizing station, and means for indicating the quantity of said retained magnetism detected at said measuring station for separating said castings into accepted and rejected categories.

3. In an automatic non-destructive testing and inspection apparatus of the character described for rapid production line testing and inspecting of the acceptability of a selected portion of each of a plurality of mass produced ferrous castings in accordance with the magnetic retention properties of said castings, the combination which comprises a magnetizing station in said apparatus and including an electromagnetic coil for establishing a magnetic field, means at said magnetizing station for supporting each said casting during testing and for automatically contacting each said portions of said casting with said coil in said magnetic field for inducing therein directed magnetism in said selected portion the retention of which is to be measured, said coil and said contacting means being configured for interfitting relation with and to conform to said selected portion of said castings for producing a directed saturated flux path through said casting and in said selected portion thereof, said portion being selected as that portion of said casting having substantially the smallest cross-section, a measuring station in said apparatus means for automatically detecting at said measuring station and amount of magnetization retained by said castings in said portion of said casting in which said directed saturated flux path was established at said magnetizing station, and means for automatically indicating the quantity of said retained magnetism detected at said measuring station for separating said castings into accepted and rejected categories.

4. In an automatic non-destructive testing and inspection apparatus of the character described for rapid production line testing and inspection of the acceptability of a selected portion of each of a plurality of mass produced ferrous castings by testing the magnetic retention properties of said portions of said castings, the combination which comprises automatic conveying means for transporting said castings separately through said apparatus and including means for insulating and separating said castings from each other and from contact with any other object which might affect the amount of induced magnetism retained by said castings, a magnetizing station in said apparatus to which said castings are individually conveyed by said conveying means and including an electromagnetic coil for establishing a magnetic field, means at said magnetizing station for automatically supporting and contacting each said casting in said magnetic field for inducing therein directed magnetism in said selected portions the retention of which is to be measured, said coil and said contacting means being configured for interfitting relation with and to conform to said selected portion of said castings for producing a directed saturated flux path through said casting and in said selected portion thereof, a measuring station in said apparatus to which said castings are conveyed by said conveying means after magnetization at said magnetizing station, means for automatically detecting at said measuring station the amount of magnetization retained by said castings in said selected portion of said casting in which said directed and saturated flux path was established at said magnetizing station, said means for automatically indicating the quantity of said retained magnetism detected at said measuring station for separating said castings into accepted and rejected categories.

References Cited by the Examiner

UNITED STATES PATENTS

| | | | |
|---|---|---|---|
| 2,444,751 | 7/1948 | Scott | 324—34 |
| 2,468,154 | 4/1949 | Ashworth et al. | 324—34 |
| 2,647,628 | 8/1953 | Diamond | 324—34 X |
| 2,822,088 | 2/1958 | Beaumont et al. | 324—34 X |

RICHARD B. WILKINSON, *Primary Examiner.*

FREDERICK M. STRADER, WALTER L. CARLSON, *Examiners.*

R. B. LAPIN, F. A. SEEMAR, *Assistant Examiners.*